Figure 1:
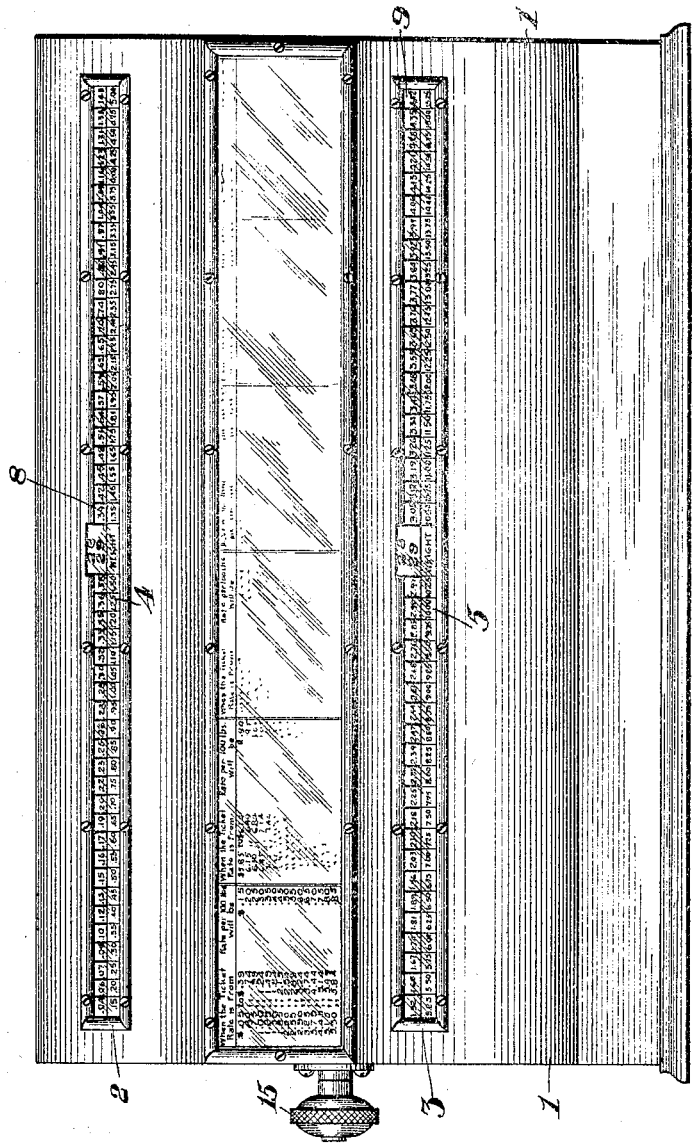

No. 773,549. PATENTED NOV. 1, 1904.
A. T. DEANE & G. COUTURE.
COMPUTING MACHINE.
APPLICATION FILED MAY 7, 1902.
NO MODEL. 2 SHEETS—SHEET 1.

Witnesses:
Geo. B Rowley
Stewart N. Dunning

Inventors
Alfred Thomas Deane
George Couture
by Jenkins & Barker
Attorneys

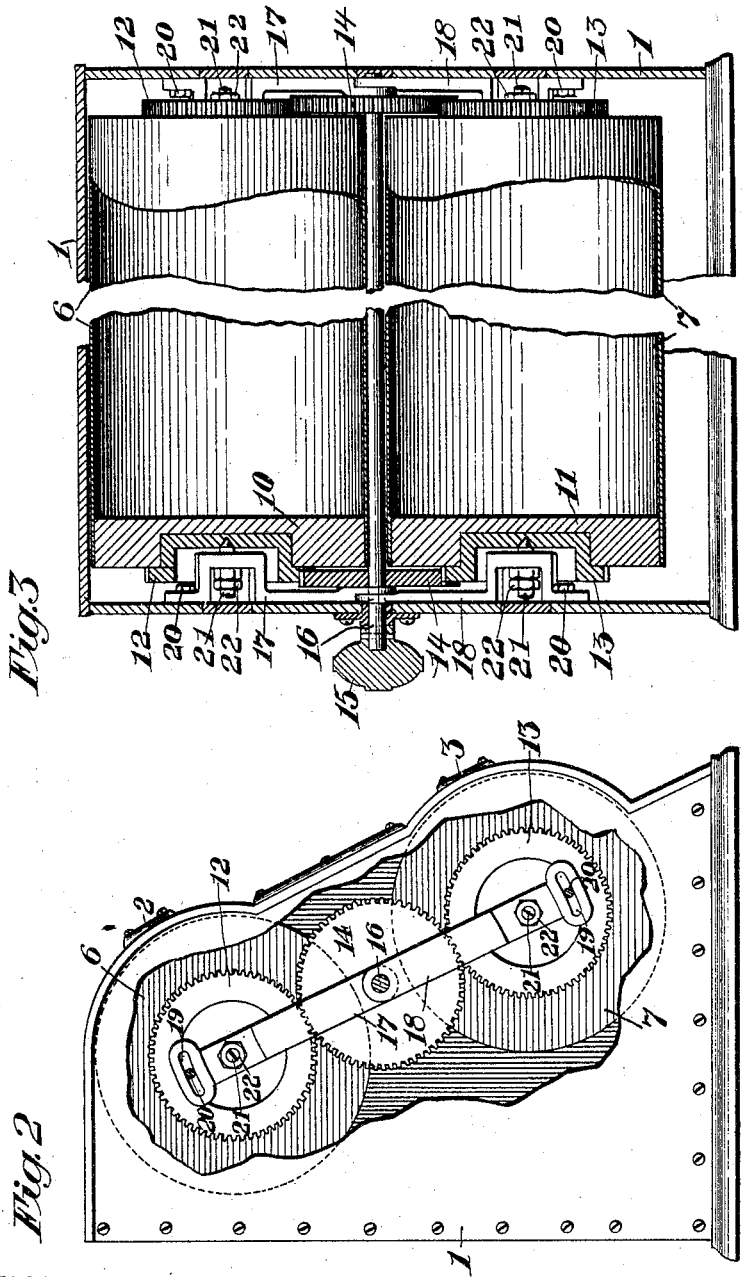

No. 773,549. Patented November 1, 1904.

UNITED STATES PATENT OFFICE.

ALFRED THOMAS DEANE AND GEORGE COUTURE, OF LOWELL, MASSACHUSETTS.

COMPUTING-MACHINE.

SPECIFICATION forming part of Letters Patent No. 773,549, dated November 1, 1904.

Application filed May 7, 1902. Serial No. 106,270. (No model.)

*To all whom it may concern:*

Be it known that we, ALFRED THOMAS DEANE and GEORGE COUTURE, both citizens of the United States, and residents of Lowell, in the county of Middlesex and State of Massachusetts, (whose post-office addresses are respectively No. 99 Orleans street and No. 100 Hastings street, Lowell, Massachusetts,) have invented certain new and useful Improvements in Computing-Machines, of which the following is a full, clear, and exact description, whereby any one skilled in the art may make and use the same.

Our invention relates particularly to computing-machines, and specifically to a computing-machine for determining the amounts of charges due upon excess baggage, which is determined by specfic and predetermined rates.

The object of the invention is to produce a mechanism having certain movable rate-sheets which may be moved with reference to rate-lines and when brought into proper position will indicate the amounts due for certain weights of baggage.

Referring to the drawings, Figure 1 is a front view of the improved computing-machine. Fig. 2 is a detail view, in end elevation, of the same with parts of the casing broken away. Fig. 3 is a detail sectional view, in front elevation, showing the arrangement of the driving parts and features of adjustability.

Up to the present time, so far as known, it has been customary to figure out the amounts due upon the baggage of a traveler from a rate-schedule which is used by railroad companies throughout the country. This necessitates weighing the baggage and determining the amount in weights exceeding the free carriage of one hundred and fifty pounds or thereabout. Ordinarily this system has entailed the use of an enormous amount of time and effort upon the part of baggage-masters and employees generally, and the results are entirely unsatisfactory, inasmuch as the employee ordinarily computes the amounts due on excess baggage in even figures, ranging from twenty-five to fifty, seventy-five, or any other number of pounds. It will be readily seen that either the traveler or the railway company must lose or gain enormous amounts with such a system in use.

It is the especial object of the present arrangement to secure definitely and accurately and with hardly a moment's delay the exact amounts due and payable for every pound of excess baggage, and to this end the ordinary rate-schedule is placed in a convenient position upon the machine, and reference to this gives at a glance the proper indication from which a reading may be taken upon a stationary rate-line, corresponding to the rate per hundred pounds for certain ticket-rates which are indicated upon the rate-schedule. Rotarily arranged behind the stationary rate-line are systems of figures placed in columns and having conveniently arranged with relation thereto a weight-column designating by increasing increments of one pound the weights corresponding to the amounts due for said weights when compared with any of the figures upon the rate-line.

Referring to the drawings, the numeral 1 indicates a sheet-metal casing inclosing the several parts of the mechanism and provided with sight-openings 2 3, within which are secured lines of figures 4 5 indicating the rate-line. Suitably supported within the casing are a pair of cylinders 6 7, which bear upon their peripheries figures constituting the computation-schedules 8 9. Centrally of this computation-schedule there is a line of figures encircling the cylinder and indicating the weights corresponding to the computed rate-column of the computation-schedule. This column overlies the word "Weight," which is placed upon the stationary rate-line. The two cylinders 6 7 are preferably of tubular form and are closed at both ends by blocks 10 11, which are recessed to receive the cup-shaped portions of a pair of gears 12 13. These gears mesh with a driving-gear 14, which is secured to and adapted to be rotated by an operating wheel or handle 15, secured to the main driving-shaft 16. Pivoted to the shaft 16 are arms 17 18, provided with slots 19 at their outer ends, which slots coöperate with locking-nuts 20 and give any desired relative adjustment of the two rolls 6 7. The rolls are supported for rotary movement upon cone-bearings, which consist of the conical-headed pins 21, carried in the arms 17 18 and adjustable therein through the medium of the lock-nuts 22. By this arrangement it will be seen that the two rolls may be adjusted axially or may be bodily swung about the axis of the driving-shaft 16 without in any way interfering with the proper mesh of the driving-gear 14 and the driven gears 12 13. The desirability of a universal adjustment of this sort is apparent, for as the several parts are assembled in the casing it is absolutely essential that the lines of figures upon the peripheries of the rolls shall register throughout their entire length with the sight-opening of the casing and with the corresponding columns of the rate-line.

Placed upon the front of the machine is a rate-schedule which gives in columns the rates per hundred pounds corresponding to certain predetermined ticket rates. These rate-columns contain the same figures as are displayed upon the rate-lines in front of the computation-schedule of the rolls.

The operation of the device is as follows: Given the ticket rate, the rate per hundred pounds of excess baggage is instantly secured by a reference to the rate-schedule. When this is found, the amount corresponding to it is found upon one of the two rate-lines, and a rotation of the cylinders which brings up the number corresponding to the number of pounds of baggage to be figured will also bring up the computed amount due, which will appear directly over the indicated figure of the rate-line.

While the system and mechanism for carrying out its use have been shown and described herein with certain specific figures, it is obvious that many changes might be made in this arrangement without in any way departing from the spirit of the invention, which contemplates the use of rotary weight-columns and computed rate-columns, the two comprising a computation-schedule and stationary rate-line, these corresponding in amounts to the rate-column amounts of the universally-employed rate-schedule.

What we claim as our invention, and desire to secure by Letters Patent, is—

1. In a computing-machine, in combination with a rate-schedule having a rate-column, a computation-schedule having a rate-line composed of the same characters as those on the said rate-column, a weight-column relatively arranged with respect to said rate-line, and a computed rate-column relatively arranged with respect to said rate-line and weight-column, one of said columns being movable with respect to another.

2. In a computing-machine, in combination with a rate-schedule having a rate-column, a computation-schedule having a rate-line composed of characters like to those on said rate-column and a weight-column and a computed rate-column both movable with respect to the rate-line, the former arranged with respect to the rate-line and the latter arranged with respect to said rate-line and weight-column.

3. In a computing-machine, in combination with a revoluble spindle, arms separately pivotally secured at their adjacent ends to said spindle, a roll pivotally mounted at each end in said arms, means for adjusting said roll longitudinally, operative connections between the spindle and roll, and means for turning the spindle.

4. In a computing-machine, in combination with a revoluble spindle, arms separately pivotally secured at their adjacent ends to said spindle, a roll pivotally mounted at each end in said arms, means for adjusting said roll longitudinally, gear connections between the spindle and roll, and means for turning the spindle.

5. In a computing-machine, in combination with a revoluble spindle, arms separately pivotally secured at their adjacent ends to said spindle, a roll pivotally mounted at each end in said arms, another set of arms pivoted on said spindle, a roll pivotally mounted on said last-mentioned arms, means for adjusting each of said rolls longitudinally, connections between the spindle and each of the rolls, and means for turning the spindle.

6. In a computing-machine, in combination with a case having openings, a revoluble spindle mounted in the case, arms extending in opposite directions from said spindle and separately pivoted at their adjacent ends thereto, rolls pivotally mounted on said arms and in relative arrangement with respect to the openings in the case, means for adjusting the rolls longitudinally, connections between the spindle and rolls, and means for turning the spindle.

ALFRED THOMAS DEANE.
GEORGE COUTURE.

Witnesses:
CHAS. H. MCINTIRE,
E. A. MORSE.